United States Patent
Tan

(10) Patent No.: US 7,908,442 B2
(45) Date of Patent: Mar. 15, 2011

(54) MEMORY MANAGEMENT METHOD AND SYSTEM

(75) Inventor: Min-Liang Tan, Carlsbad, CA (US)

(73) Assignee: Jook, Inc., Carlsbad, CA (US)

( * ) Notice: Subject to any disclaimer, the term of this patent is extended or adjusted under 35 U.S.C. 154(b) by 568 days.

(21) Appl. No.: 11/970,012

(22) Filed: Jan. 7, 2008

(65) Prior Publication Data

US 2008/0177972 A1    Jul. 24, 2008

Related U.S. Application Data

(63) Continuation-in-part of application No. 11/625,692, filed on Jan. 22, 2007, now Pat. No. 7,817,960.

(51) Int. Cl.
*G06F 12/00* (2006.01)
(52) U.S. Cl. ............................................. 711/154; 711/6
(58) Field of Classification Search .................. 711/154, 711/6

See application file for complete search history.

(56) References Cited

U.S. PATENT DOCUMENTS

| | | | | |
|---|---|---|---|---|
| 5,787,490 | A * | 7/1998 | Ozawa | 711/173 |
| 5,983,004 | A * | 11/1999 | Shaw et al. | 709/227 |
| 7,062,627 | B2 * | 6/2006 | Murayama et al. | 711/170 |
| 2005/0144402 | A1 * | 6/2005 | Beverly | 711/152 |
| 2006/0028936 | A1 * | 2/2006 | Ninomiya et al. | 369/47.1 |
| 2006/0135138 | A1 * | 6/2006 | Lazaridis | 455/417 |
| 2007/0260822 | A1 * | 11/2007 | Adams | 711/147 |
| 2007/0283125 | A1 * | 12/2007 | Manczak et al. | 711/207 |

* cited by examiner

*Primary Examiner* — Hashem Farrokh
(74) *Attorney, Agent, or Firm* — Conley Rose, P.C.

(57) ABSTRACT

Wireless headphones receive music and video from media devices via different wireless transmission methods such as using Bluetooth. However, wireless headphones suffer from limitations despite the convenience they offer to users. Some such wireless headphones allow one user to share the music experience by passing one side of the wireless headphone to a third party. The third party does not however get to experience and enjoy the full stereo experience of the music. In addition, sharing of music by transfer of media files from one storage medium to other storage medium often infringes upon third party intellectual property rights. An embodiment of the invention describes a method and a system that enable wireless sharing of audio sounds among a plurality of users.

29 Claims, 3 Drawing Sheets

MEMORY MANAGEMENT METHOD AND SYSTEM

RELATED APPLICATION

This application is a continuation-in-part of U.S. Ser. No. 11/625,692 filed Jan. 22, 2007, and claims the benefit thereof.

FIELD OF INVENTION

The invention relates generally to the field of wireless communications. In particular, the invention relates to a memory management system for devices.

BACKGROUND

Many media devices can receive radio broadcasts from various sources including frequency modulation (FM), amplitude modulation (AM) or satellite broadcasts. With respect to headphones, wireless headphones receive music from media devices, such as mp3 players, via a variety of methods such as infrared (IR) transmission, 25 MHz radio, or 2.4 GHz radio transmission technologies such as Bluetooth or wireless universal serial bus (WUSB). Signals can be transmitted from one source to another wirelessly.

Media devices can transfer media files such as music and/or video files wirelessly between other similar media devices using the methods as described above. The transferring of such files is usually from one storage medium to another.

Despite the advantages of the foregoing, wireless headphones suffer from limitations. Some models of wireless headphones only allow one user to share the music experience by passing one side of the wireless headphone to a third party. This shared experience, however, does not allow the third party to experience and enjoy the full stereo experience of the music. Separately, existing wireless headphones also do not enable users to share music from one same media device. In addition, sharing of music by transfer of media files from one storage medium to other storage medium often infringes upon third party intellectual property rights. Hence, in view of the foregoing problems, there affirms a need for a method and a system that enable wireless sharing of audio sounds among a plurality of users.

SUMMARY

Embodiments of the invention disclosed herein provide a system and a method for memory management of devices.

In accordance with a first aspect of the invention, there is disclosed a memory management method comprising providing a first physical memory module (PMM) on a device. The first PMM has a first portion and a second portion. The method also comprises detecting coupling of a second PMM to the device and generating a virtual memory segment comprising the first portion of the first PMM and at least a portion of the second PMM in response to the second PMM being coupled to the device. The virtual memory segment is one of random access memory and storage memory.

In accordance with a second aspect of the invention, there is disclosed a device-readable medium having stored therein a plurality of programming instructions, which when executed on a device, the instructions cause the device to provide a first physical memory module (PMM) on a device. The first PMM has a first portion and a second portion. The instructions also cause the device to detect coupling of a second PMM to the device and generate a virtual memory segment comprising the first portion of the first PMM and at least a portion of the second PMM in response to the second PMM being coupled to the device. The virtual memory segment is one of random access memory and storage memory.

In accordance with a third aspect of the invention, there is disclosed a memory management system comprising means for providing a first physical memory module (PMM) on a device. The first PMM has a first portion and a second portion. The memory management system also comprises means for detecting coupling of a second PMM to the device and means for generating a virtual memory segment comprising the first portion of the first PMM and at least a portion of the second PMM in response to the second PMM being coupled to the device. The virtual memory segment is one of random access memory and storage memory.

In accordance with a fourth aspect of the invention, there is disclosed a device peripheral comprising a controller, a transceiver and an interface. The transceiver is controllable by the controller for performing a signaling operation. The signaling operation is one of receiving reception signals, transmitting transmission signals and simultaneously receiving the reception signals and transmitting the transmission signals. The interface is couplable to a physical memory module (PMM) for communicating the controller with the PMM. The PMM has a memory space and the controller generates a virtual memory segment comprising at least a portion of the memory space of the PMM for use by the controller.

In accordance with a fifth aspect of the invention, there is disclosed a memory management method comprising providing a device comprising a transceiver. The transceiver performs a signaling operation. The signaling operation is one of receiving reception signals, transmitting transmission signals and simultaneously receiving the reception signals and transmitting the transmission signals. The method also comprises detecting coupling of a physical memory module (PMM) with the device in which the PMM has a memory space. Lastly, the method comprises generating a virtual memory segment comprising at least portion of the memory space of the PMM.

BRIEF DESCRIPTION OF THE DRAWINGS

Embodiments of the invention are disclosed hereinafter with reference to the drawings, in which.

DETAILED DESCRIPTION

Figure 1:
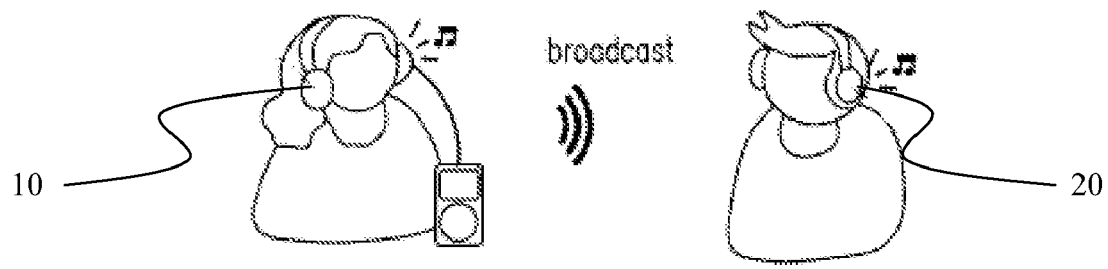
FIG. 1 illustrates a schematic view of a person sharing audio in accordance with one aspect of the present invention.

A system and a method for memory management of devices are described hereinafter for addressing the foregoing problems. The device is preferably a standalone device with audio playback, telecommunication or personal digital assistant (PDA) like functionalities. Alternatively, the device is a dongle couplable to an audio device, a telecommunication device, a PDA or any such similar device.

For purposes of brevity and clarity, the description of the invention is limited hereinafter to applications related to memory management of devices. This however does not preclude various embodiments of the invention from other applications that require similar operating performance. The fundamental operational and functional principles of the embodiments of the invention are common throughout the various embodiments.

Exemplary embodiments of the invention described hereinafter are in accordance with FIGS. 1 to 5 of the drawings, in which like elements are numbered with like reference numerals.

Dedicated and Broadcast Use

As shown in FIG. 1, a user of a first device 10 can opt to only transmit a dedicated signal from the first device 10 to a second device 20; in this instance, the second device 20 will be the only receiving device for the first device 10. The second device 20 decodes the received signal from the first device 10 to provide a user of the second device 20 with the corresponding information. As set forth below in further detail, in a preferred embodiment, the information transmitted by the second device 20 as well as the information received by the first device 10 can specifically be selected or chosen by the respective users of the first device 10 and the second device 20.

As used herein, the term "dedicated" is used to refer to a closed network, whereby only users of that network may have ready access to the decoding and/or decrypting technology to access the communicated signals. A "closed" network can refer to a network that employs proprietary technology that is not directly interoperable with other standards-based networks, or that adds an additional layer of encoding onto standards-based networks. A "closed network" also encompasses a private network that can only be used by authenticated or authorized devices; e.g. outsider use may be prohibited and enforced through cryptographic means. A closed network is thus distinct from an open network such as Bluetooth, whereby any device that is Bluetooth-enabled may (in the absence of proprietary encoding or encryption) receive and process that signal.

Information stored in the device may also be encrypted to provide a further layer of security to information communication between devices. Encryption can be used to secure information communications and stored information. Digital communications accommodate the use of encryption. As consumers continue to make the transition from wired to wireless communications devices, the use of encryption has become more important to the end user in some contexts.

Figure 2:
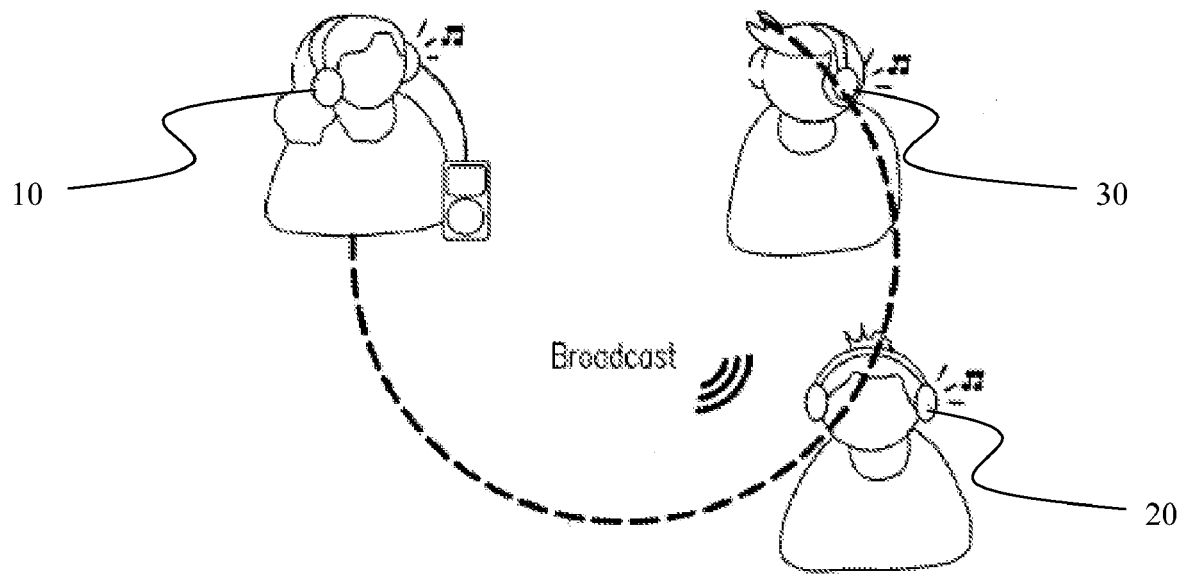
FIG. 2 illustrates a schematic view of a plurality of persons sharing audio from a single source in accordance with one aspect of the present invention.

Referring now to FIG. 2, the user of the first device 10 can opt to set the first device 10 to broadcast. As such, enabled third parties in the range of transmission of the first device 10, such as a user of a third device 30 and potentially others, can opt to set their respective devices to detect and receive information from the first device 10, or on a channel on which the first device 10 is set to transmit. The third device 30 can now decode the signal from the first device 10 to provide the user of the third device 30 with the corresponding information.

Figure 3:
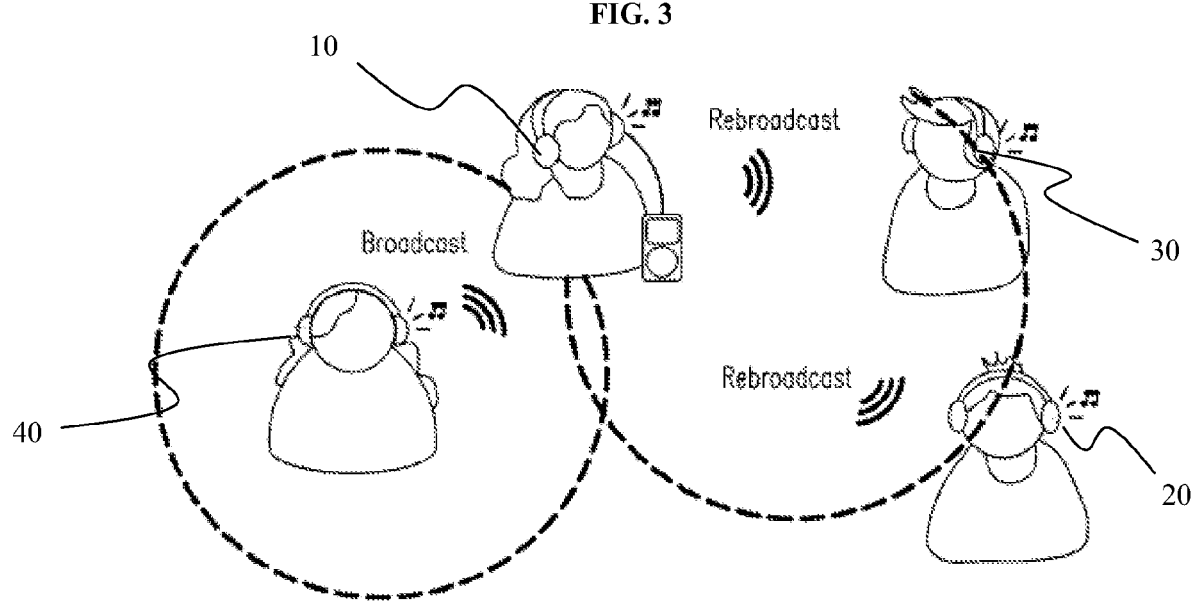
FIGS. 3 and 4 illustrate other embodiments of the invention in which a plurality of rebroadcasts occur.

As shown in FIG. 3, the user of the first device 10 can also opt to set the first device 10 to receive from other transmitting devices, including the second device 20 and the third device 30.

Re-Broadcasting

Figure 4:
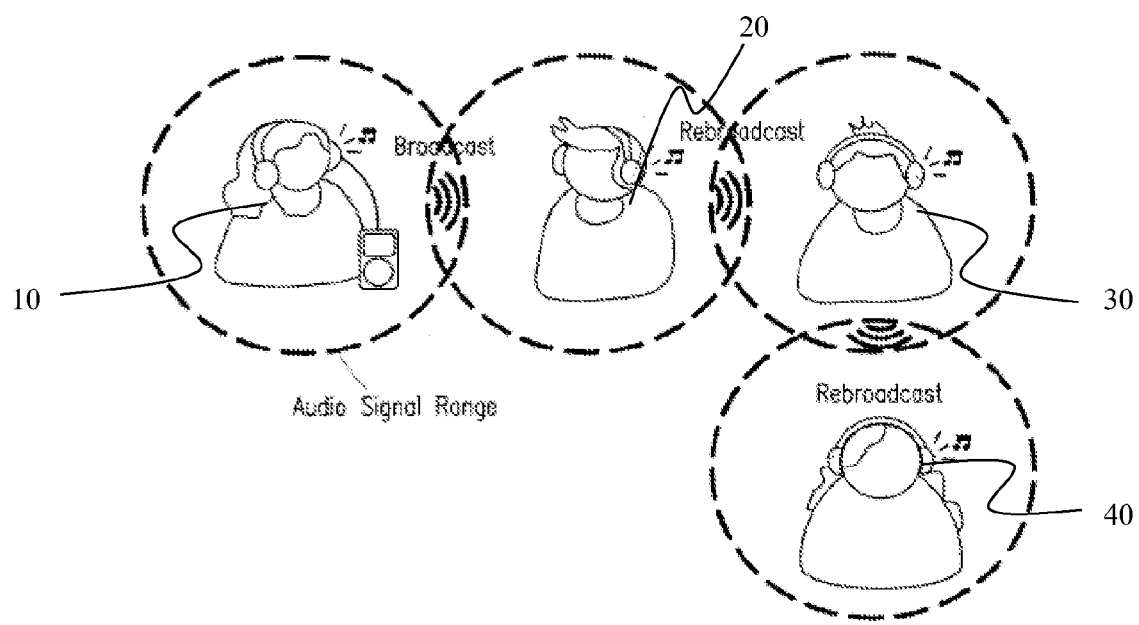

The system and method of the present invention can also be used in the context of re-broadcasting. For example, as shown in FIG. 4, the user can set the first device 10 on broadcast, the user of the second device 20 which is receiving the signals can opt to set the second device 20 to receive the signals from the first device 10 and to simultaneously re-broadcast the same signals to other users' devices (for example, the third device 30 and a fourth device 40). Alternatively, the second device 20 can simultaneously receive signals from the first device 10 as well as transmit information, in a form of data signals, already stored within the second device 20 to the other users' devices (for example, the third device 30 and the fourth device 40).

Re-broadcasting may be undertaken before, during and after decoding of original signals. If the signals have been decoded prior to re-broadcasting, the signals will be encoded again prior to retransmission. Preferably, the encoding produces the same original signal. Alternatively, the encoding produces a modified signal.

Re-broadcasting thus allows the user of the third device 30 who is out of the range of the first device 10 but in the range of the re-broadcast of the second device 20 to receive the appropriate signals from the first device 10 via the second device 20. Likewise, if the user of the third device 30 opts to set the third device 30 to re-broadcast, the user of the fourth device 40, who is out of the range of the broadcast of the first device 10 and the rebroadcast of the second device 20, can opt to set the fourth device 40 to receive the appropriate signals from the first device 10 via the second device 20 and the third device 30. For each broadcasting option as described above, the users of the second device 20, the third device 30 and the fourth device 40 can also set their respective devices to receive signals which are being broadcasted and re-broadcasted.

Figure 5:
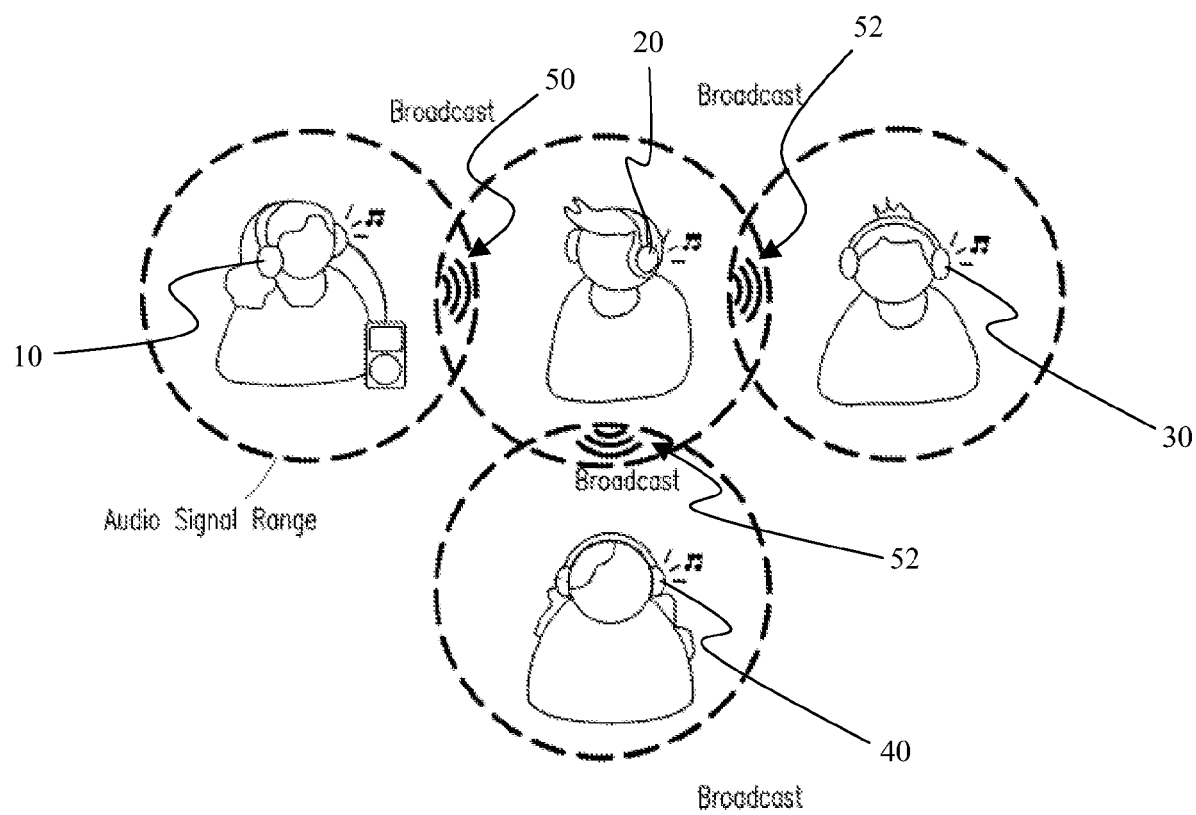
FIG. 5 illustrates another embodiment of the invention in which a plurality of broadcasts occurs, and in which differing audio signals may be communicated among the various devices.

FIG. 5 depicts an alternative embodiment of the invention that enables use with simultaneous reception and transmission/broadcast of different audio signals. As shown in FIG. 5, the user of the first device 10 can set the first device 10 to transmit or broadcast a certain signal 50. The user of the second device 20 can set the second device 20 to receive the transmission/broadcast of the signal 50 from the first device 10. The user of the second device 20 can simultaneously opt to set the second device 20 to transmit or broadcast a different signal 52 on a different channel which can be received by users of, for example, the third device 30 and the fourth device 40 provided that they have set their respective devices to receive the transmission or broadcast of the signal 52 on that channel from the user of the second device 20.

The configuration setting of the first device 10 to transmit or to simultaneously transmit and receive can be selected manually by the user of the first device 10. Alternatively, the configuration setting of the first device 10 to receive, to transmit or to simultaneously transmit and receive is performed automatically upon detection of signals from another device, such as the second device 20 or the third device 30.

Preferably, the device also enables use in multi-channel transmission or broadcast (simultaneous or otherwise). With multiple users transmitting in a limited range, wireless transmission may alternatively be performed on un-dedicated channels that users may opt to receive either:
  i. automatically via hunting and/or frequency hopping; or
  ii. manually by tuning to specific frequencies denoted by:
    a. discrete channels denoted by numbers (for example, Channel 1 and Channel 2);
    b. discrete channels denoted with colors (for example, Red, Green and Blue); or
    c. other methods consistent with those known to persons skilled in the art.

In order to identify the mode in which the device is operating (transmitting, broadcasting, re-broadcasting or receiving), the user of the device can opt to set either cues on his device or cues to be displayed or received on third parties' device to allow the third parties to identify the mode in which the device is operating. The cues could take various forms or combination of forms such as:

a. visual cues, including text, colored indicators or lights, which will indicate the various modes in which the device is operating; and
b. sound cues which will indicate the various modes in which the device is operating. Such sounds can either be heard audibly or through use of the device.

(For example, the first device 10 is set to broadcast transmissions. The first device 10 flashes a blue light which users of other devices (for example, the second device 20 and the third device 30) can see and then opt to set the second device 20 and the third device 30 to receive the broadcast of the first device 10.)

Storage and Memory Management

The device, such as the first device 10, possesses an in-built internal storage module for storing any data files such as audio files, image files and the like. The storage module is preferably a semiconductor memory device such as static random access memory (SRAM) or flash memory. Alternatively, the storage module is a small form-factor hard-drive or solid state hard-drive typically used in modern consumer-electronic devices.

The storage module can be partitioned into different regions for different usage purposes. Specifically, the storage module of the first device 10 is preferably configurable such that a portion of the disc-space of the storage module is specifically allocated for storage of data files. This portion of the disc-space is termed storage area. The remaining portion of the disc-space of the storage module is then usable as available disc-spaces for devices that the first device 10 is couplable thereto. This remaining portion of the disc-space is termed dynamic-usage area. For example, the disc-space of the storage module may be divided according to a thirty percent to seventy percent ratio in which thirty percent of the disc-space is used for storage of data files and seventy percent of the disc-space is available for used by devices that are coupled to the first device 10. Examples of devices couplable to the first device 10 include PDAs, cellphones, laptops, personal-entertainment devices and the like.

When the first device 10 is coupled to a device such as a PDA, the PDA is able to access the data files stored on the storage area of the storage module of the first device 10. For example, if audio files such as mp3 files are stored on the storage area, the PDA is able to play the audio files using its on-board audio playback capabilities by "streaming" the files from the storage area. As well known to persons skilled in the art, such file "streaming" technique is also known as intra-device file access.

The dynamic-usage area of the storage module is then usable by the PDA as a temporary storage area or as an extended memory area for the PDA. When the dynamic-usage area is to be used as a temporary storage area by the PDA, typical techniques well known to persons skilled in the art for performing disc partitioning are used for partitioning the dynamic usage area. The partitioning schemes used may include Microsoft Windows-based, LINUX-based, Apple Macintosh OS-X based and UNIX-based schemes. After partitioning is completed, the dynamic usage area is then ready for use by the PDA to temporary store any files on an "as-needed" basis for as long as the first device 10 is coupled to the PDA.

Conversely, if the dynamic-usage area is to be used as an extended memory area by the PDA, the PDA then treats the dynamic-usage area as an extended region of memory space available for use by the PDA. Effectively, the physical memory space available for access by the PDA is enlarged when the first device 10 is coupled to the PDA. Specifically, the PDA creates a virtual memory space that straddles over the dynamic-usage area and the PDA's internal memory to form a contiguous memory block available for use by the PDA. The memory management subsystem of the PDA then extends functionalities such as large address space, memory mapping, shared virtual memory and the like to the dynamic-usage area. The dynamic-usage area is essential treated by the PDA as an additional, integrated in-built memory module of the PDA. Hence, the additional memory space offered by the dynamic-usage area is usable by the operating system of the PDA for executing and running of software applications installed thereon.

In another embodiment of the invention, the first device 10 preferably manages the dynamic-usage area and the PDA's internal memory when the first device 10 is coupled to the PDA. An example is when the first device 10 requires use of the PDA's internal memory, the first device 10 then sends a request to the PDA in a manner similar to the working principles of direct memory access (DMA) used conventionally by personal computers (PCs). When the first device 10 requires writing to or reading from the internal memory of the PDA, for example during data processing by the first device 10, the first device 10 is granted access to the PDA's internal memory for performing any read or write operations to the PDA's internal memory. This enables control of the internal memory of the PDA by the first device 10.

The internal memory of the PDA is then usable by the first device 10 as a temporary storage area or as an extended memory area for the first device 10. When the internal memory is used as a temporary storage area by the first device 10, typical techniques well known to persons skilled in the art for performing disc partitioning may be employed for partitioning the internal memory of the PDA if the internal memory is not being used by the PDA. The partitioning schemes adopted may include Microsoft Windows-based, LINUX-based, Apple Macintosh OS-X based and UNIX-based schemes. After partitioning is completed, the internal memory of the PDA is then ready for use by the first device 10 to temporary store any files on an "as-needed" basis for as long as the first device 10 is coupled to the PDA.

Conversely, if the internal memory of the PDA is used as an extended memory area by the first device 10, the first device 10 then treats the internal memory of the PDA as an extended region of memory space available for use by the first device 10. Effectively the physical memory space available for access by the first device 10 is enlarged when the first device 10 is coupled to the PDA. Specifically, the first device 10 creates a virtual memory space that straddles over the dynamic-usage area and the PDA's internal memory to form a contiguous memory block available for use by the first device 10. The first device 10 then preferably performs memory management such as large address space, memory mapping, shared virtual memory and the like to the dynamic-usage area. The internal memory of the PDA is treated as an additional, integrated in-built memory module of the first device 10. Hence, the additional memory space offered by the internal memory of the PDA is usable by the first device 10 for executing and running of software applications installed thereon. After the first device performs read or write operations to the internal memory of the PDA, control of the internal memory of the PDA is then returned to the PDA. Furthermore, the PDA and the first device 10 are able to simultaneously access each other's memory space.

In addition, the first device 10 comprises a slot for receiving add-on memory storage cards. The add-on memory storage cards include multimedia cards (MMC), secured digital (SD) cards, memory sticks and xD picture cards. The first device 10 then apportions the memory space of the add-on memory storage card into dynamic-usage area or storage area for use by the first device 10.

Alternatively, the intelligence-logic of the first device 10 is preferably implementable as an application-specific integrated circuit (ASIC) chip with a predefined storage area contained therein. The ASIC chip is then built on-board a device such as the PDA. Another device, such as a cellphone which is couplable to the PDA via interfacing means using any communication interface standards (for example, USB) well known in the art, is then able to access the storage area of the ASIC chip of the PDA. Any available disc-spaces of the ASIC chip are usable as the dynamic-usage area. The manner of usage of the dynamic-usage area is similar to the aforementioned descriptions.

Yet alternatively, the ASIC chip built on-board the PDA is able to allocate the available disc-spaces of add-on memory storage cards receivable by the PDA for use as extended memory area by the PDA. The add-on memory storage cards include multimedia cards (MMC), secured digital (SD) cards, memory sticks and xD picture cards. The manner of usage of the available disc-spaces of the add-on memory storage cards as extended memory area by the PDA is similar to the aforementioned descriptions.

In addition, not all available disc-spaces of the dynamic-usage area of either the first device 10 or the ASIC chip will be used as additional memory spaces by the PDA or the cellphone. The amount of disc-spaces of the dynamic-usage area that will be allocated as memory spaces depends on the setting for a desired total memory size a user has configured the PDA or the cellphone to take on when the first device 10 is coupled thereto or if the ASIC chip is built on-board the PDA.

In the foregoing manner, a system and a method for memory management of devices are described according to various embodiments of the invention for addressing at least one of the foregoing disadvantages. Although a few embodiments of the invention are disclosed, it will be apparent to one skilled in the art in view of this disclosure that numerous changes and/or modification can be made without departing from the spirit and scope of the invention.

The invention claimed is:

1. A memory management method comprising:
providing a first physical memory module (PMM) on a device, the first PMM having a first portion and a second portion;
allocating the first portion and the second portion of the first PMM based on a memory size proportion, the memory size proportion determining a proportion of size of the first portion to size of the second portion of the first PMM;
detecting coupling of a second PMM to the device; and
generating a virtual memory segment comprising the first portion of the first PMM and at least a portion of the second PMM in response to the second PMM being coupled to the device, the virtual memory segment being one of random access memory and storage memory.

2. The memory management method as in claim 1, generating the virtual memory segment comprising:
providing a virtual memory size; and
generating the virtual memory segment one of having at least the virtual memory size and not exceeding the virtual memory size.

3. The memory management method as in claim 1, generating the virtual memory segment comprising:
providing a virtual memory size;
subtracting size of the first portion of the first PMM based on the memory size proportion from the virtual memory size to obtain a remaining memory size therefrom; and
allocating the at least a portion of the second PMM having substantially the remaining memory size for constituting the virtual memory segment.

4. The memory management method as in claim 3, allocating the at least a portion of the second PMM having substantially the remaining memory size for constituting the virtual memory segment comprising:
identifying unused space on the second PMM; and
obtaining the at least a portion of the second PMM from the unused space.

5. The memory management method as in claim 1, generating the virtual memory segment comprising:
identifying unused space on the second PMM; and
assigning the unused space as the at least a portion of the second PMM.

6. The memory management method as in claim 5, generating the virtual memory segment comprising:
providing a virtual memory size;
subtracting size of the unused space on the second PMM from the virtual memory size to obtain a remaining memory size therefrom; and
allocating the first portion of the first PMM having substantially the remaining memory size for constituting the virtual memory segment.

7. The memory management method as in claim 1, detecting coupling of a second PMM to the device comprising:
detecting coupling of a device peripheral to the device, the second PMM being the device peripheral.

8. The memory management method as in claim 1, detecting coupling of a second PMM to the device comprising:
detecting coupling of a host device to the device, the host device comprising the second PMM.

9. The memory management method as in claim 1, detecting coupling of a second PMM to the device comprising:
detecting one of wired and wireless coupling of the second PMM to the device.

10. A device-readable medium having stored therein a plurality of programming instructions, which when executed on a device, the instructions cause the device to:
provide a first physical memory module (PMM) on the device, the first PMM having a first portion and a second portion;
allocate the first portion and the second portion of the first PMM based on a memory size proportion, the memory size proportion determining a proportion of size of the first portion to size of the second portion of the first PMM;
detect coupling of a second PMM to the device; and
generate a virtual memory segment comprising the first portion of the first PMM and at least a portion of the second PMM in response to the second PMM being coupled to the device, the virtual memory segment being one of random access memory and storage memory.

11. The device-readable medium as in claim 10, the plurality of programming instructions, which when executed on a device, cause the device further to:
provide a virtual memory size; and
generate the virtual memory segment one of having at least the virtual memory size and not exceeding the virtual memory size.

12. The device-readable medium as in claim 10, the plurality of programming instructions, which when executed on a device, cause the device further to:
provide a virtual memory size;

subtract size of the first portion of the first PMM based on the memory size proportion from the virtual memory size to obtain a remaining memory size therefrom; and allocate the at least a portion of the second PMM having substantially the remaining memory size for constituting the virtual memory segment.

13. The device-readable medium as in claim 12, the plurality of programming instructions, which when executed on a device, cause the device further to:

identify unused space on the second PMM; and obtain the at least a portion of the second PMM from the unused space.

14. The device-readable medium as in claim 10, the plurality of programming instructions, which when executed on a device, cause the device further to:

identify unused space on the second PMM; and assign the unused space as the at least a portion of the second PMM.

15. The device-readable medium as in claim 14, the plurality of programming instructions, which when executed on a device, cause the device further to:

provide a virtual memory size;

subtract size of the unused space on the second PMM from the virtual memory size to obtain a remaining memory size therefrom; and allocate the first portion of the first PMM having substantially the remaining memory size for constituting the virtual memory segment.

16. The device-readable medium as in claim 10, the plurality of programming instructions, which when executed on a device, cause the device further to:

detect coupling of a device peripheral to the device, the second PMM being the device peripheral.

17. The device-readable medium as in claim 10, the plurality of programming instructions, which when executed on a device, cause the device further to:

detect coupling of a host device to the device, the host device comprising the second PMM.

18. The device-readable medium as in claim 10, the plurality of programming instructions, which when executed on a device, cause the device further to:

detect one of wired and wireless coupling of the second PMM to the device.

19. A memory management system comprising:

means for providing a first physical memory module (PMM) on a device, the first PMM having a first portion and a second portion;

means for allocating the first portion and the second portion of the first PMM based on a memory size proportion, the memory size proportion determining a proportion of size of the first portion to size of the second portion of the first PMM;

means for detecting coupling of a second PMM to the device; and means for generating a virtual memory segment comprising the first portion of the first PMM and at least a portion of the second PMM in response to the second PMM being coupled to the device, the virtual memory segment being one of random access memory and storage memory.

20. The memory management system as in claim 19, the means for generating the virtual memory segment comprising:

means for providing a virtual memory size; and means for generating the virtual memory segment one of having at least the virtual memory size and not exceeding the virtual memory size.

21. The memory management system as in claim 19, the means for generating the virtual memory segment comprising:

means for providing a virtual memory size;

means for subtracting size of the first portion of the first PMM based on the memory size proportion from the virtual memory size to obtain a remaining memory size therefrom; and means for allocating the at least a portion of the second PMM having substantially the remaining memory size for constituting the virtual memory segment.

22. The memory management system as in claim 21, the means for allocating the at least a portion of the second PMM having substantially the remaining memory size for constituting the virtual memory segment comprising:

means for identifying unused space on the second PMM; and means for obtaining the at least a portion of the second PMM from the unused space.

23. The memory management system as in claim 19, the means for generating the virtual memory segment comprising:

means for identifying unused space on the second PMM; and means for assigning the unused space as the at least a portion of the second PMM.

24. The memory management system as in claim 23, the means for generating the virtual memory segment comprising:

means for providing a virtual memory size;

means for subtracting size of the unused space on the second PMM from the virtual memory size to obtain a remaining memory size therefrom; and means for allocating the first portion of the first PMM having substantially the remaining memory size for constituting the virtual memory segment.

25. The memory management system as in claim 19, the means for detecting coupling of a second PMM to the device comprising:

means for detecting coupling of a device peripheral to the device, the second PMM being the device peripheral.

26. The memory management system as in claim 19, the means for detecting coupling of a second PMM to the device comprising:

means for detecting coupling of a host device to the device, the host device comprising the second PMM.

27. The memory management system as in claim 19, the means for detecting coupling of a second PMM to the device comprising:

means for detecting one of wired and wireless coupling of the second PMM to the device.

28. A device peripheral comprising:

a controller;

a transceiver controllable by the controller for performing a signaling operation, the signaling operation being one of receiving reception signals, transmitting transmission signals and simultaneously receiving the reception signals and transmitting the transmission signals;

a first physical memory module (PMM) having a first memory space, a first portion and a second portion, the first portion and the second portion of the first PMM being allocated based on a memory size proportion, the memory size proportion determining a proportion of size of the first portion to size of the second portion of the first PMM; and an interface couplable to a second physical memory module (PMM) for communicating the controller with the second PMM, the second PMM having a second memory space, the controller for generating a virtual memory segment comprising at least a portion of the first memory space of the first PMM and at least a portion of the second memory space of the second PMM, the virtual memory space for use by the controller.

29. A memory management method comprising:
provinding a device comprising:
- a transceiver, the transceiver for performing a signaling operation, the signaling operation being one of receiving reception signals, transmitting transmission signals and simultaneously receiving the reception signals and transmitting the transmission signals; and
- a first physical memory module (PMM) having a first memory space, a first portion and a second portion, the first portion and the second portion of the first PMM being allocated based on a memory size proportion, the memory size proportion determining a proportion of size of the first portion to size of the second portion of the first PMM;

detecting coupling of a second physical memory module (PMM) with the device, the second PMM having a second memory space; and generating a virtual memory segment comprising at least a portion of the first memory space of the first PMM and at least a portion of the second memory space of the second PMM.

* * * * *